United States Patent [19]

Baxter et al.

[11] Patent Number: 4,659,424

[45] Date of Patent: Apr. 21, 1987

[54] MANUFACTURE OF ELONGATE MEMBERS OF INDEFINITE LENGTH

[75] Inventors: Gordon D. Baxter, Kingston; Oleg Axiuk, Pincourt, both of Canada

[73] Assignee: Northern Telecom Limited, Montreal, Canada

[21] Appl. No.: 849,629

[22] Filed: Apr. 9, 1986

[51] Int. Cl.[4] .............................................. H01B 13/14
[52] U.S. Cl. .................................... 156/51; 156/64; 156/244.12; 156/356; 156/500; 264/174; 264/272.15; 425/135
[58] Field of Search ............. 156/51, 64, 244.12, 156/356, 500; 264/174, 272.15; 324/61 R; 425/135

[56] References Cited

U.S. PATENT DOCUMENTS

| | | | |
|---|---|---|---|
| 3,502,752 | 3/1970 | Brown | 264/174 X |
| 4,029,458 | 6/1977 | Kim et al. | 425/135 |
| 4,095,156 | 6/1978 | Borisov et al. | 425/135 X |
| 4,231,823 | 11/1980 | Hart et al. | 156/64 |
| 4,426,239 | 1/1984 | Upmeier | 156/64 |
| 4,493,747 | 1/1985 | Kanotz et al. | 156/64 |

Primary Examiner—Robert A. Dawson
Attorney, Agent, or Firm—R. J. Austin

[57] ABSTRACT

In the making of cable with spaced conductor wires or tensile members in a non-circular jacket, the wires of member are maintained in desired angular positions within the jacket by guiding them through a core tube which is controllably rotatable within the extruder cross-head. The angular positions of the wires or members are monitored and upon their positions departing from the desired positions, the core tube is rotated in the appropriate direction to return them to the desired positions.

7 Claims, 3 Drawing Figures

MANUFACTURE OF ELONGATE MEMBERS OF INDEFINITE LENGTH

This invention relates to the manufacture of elongate members of indefinite length.

Elongate members of indefinite length are known having at least two laterally spaced elongate elements surrounded and held in their relative positions by an extruded jacket of polymeric material. In some constructions, the member is non-circular in any cross-section normal to its length. In such constructions, difficulty may be found in providing symmetry to the structure in a cross-section normal to the length so that each of the laterally spaced elements lies closer to some parts of the surface of the elongate member than to others. For instance, some elongate members are of oval or elliptical cross-section. In these constructions, for there to be symmetry where two elongate elements are surrounded by an extruded jacket, the elements must be spaced along an axis of the cross-sectional shape, e.g. a major axis, with each element symmetrically positioned upon that axis. However it is not unusual to discover that each element lies asymmetrically relative to the axis thereby being closer to the outer surface of the elongate member on that side of the axis than on the other. Also, in cases where there is a square cross-sectional shape to accommodate, for instance, four jacket surrounded elongate elements, these elements should lie upon diagonal lines of the square to be symmetrically positioned.

In all products, this lack of symmetry makes an imperfect product and may result in one or more elongate elements being disposed axially at the surface of the jacket so as not to be completely covered by it. The lack of symmetry is markedly more serious when the elongate member is an electrical cable comprising elongate elements in the form of at least two electrically conductive wires surrounded by a dielectric jacket. In such a structure, for instance as in a telecommunications cable, lack of symmetry results in a departure in the electrical characteristics from those required by the structure. For instance, the approach of the conductor wires to one part of the outer surface of the jacket will result in a deviation in capacitance from that required.

The present invention provides a method and an apparatus which will overcome the lack of symmetry defect. In the apparatus and method of the present invention, a core tube which is provided in a cross-head for guiding the elongate elements towards and through a die orifice and the core tube is mounted so as to enable it to be subjected to a degree of rotational movement within the cross-head. This enables the core tube to be controllably rotated so as to adjust its angular position within the cross-head thereby adjusting the angular positions of the elongate elements relative to the die orifice and thus relative to jacket material within which they are to be embedded during an extrusion procedure through the orifice. By this means the elongate elements may be angularly adjusted in position as required to maintain their desired positional relationship with regard to the outside shape of the elongate member.

According to one aspect of the present invention there is provided an apparatus for making an elongate member of indefinite length having at least two laterally spaced elongate elements surrounded by an extruded non-circular jacket of polymeric material comprising an extruder cross-head having an extrusion die defining a die orifice of non-circular cross-section, a core tube within the cross-head and upstream from the die orifice, the core tube defining at least two side-by-side and laterally spaced guide passages for directing the laterally spaced elements through the die orifice as they move along a passline through the cross-head, the core tube mounted within the cross-head to allow for a degree of rotational movement of the core tube for adjusting the angular positions of the elements relative to the die orifice.

With the use of the above apparatus according to the invention, the position of the elongate elements within the elongate member may be monitored by subjecting samples of the finished product to examination. In this case where a deviation from the desired positions of the elements is found, then the core tube may be rotated by manual operation within the cross-head so as to adjust its position and move the elongate elements towards and into their desired positions within the elongate member.

Preferably, a driving means is provided for rotating the core tube so as to adjust its rotational position. This driving means may comprise a stepper motor and an endless drive member drivably connects the motor with the core tube. Also in a preferred arrangement, a monitoring means is positioned downstream from the cross-head for monitoring a parameter indicative of the angular position of the laterally spaced elements within the extruded jacket and an analyzing and control means is also provided to analyze the monitored values received from the monitoring means. The analyzing and control means is operable, upon an analyzation of a monitored value differing from that required for a desired angular position of the elements, to actuate the driving means and rotate the core tube in the appropriate direction to move the elements relative to the die orifice towards their desired angular positions within the jacket. By the use of the preferred apparatus, the monitoring function may be performed on a continuous basis thereby avoiding the necessity of taking samples of the finished product for the monitoring purpose.

In a case where the elongate member comprises at least two elongate elements in the form of electrically conductive wires and the jacket is a dielectric material, the monitoring means preferably comprises a capacitance monitor for producing monitored signals indicative of the capacitance of the elongate member. Where these signals differ from those required for the desired capacitance of the elongate member then the analyzing and control means is operable to actuate the driving means to rotate the core tube in the appropriate direction.

According to a further aspect of the present invention, a method is provided for producing an elongate member of indefinite length having at least two laterally spaced elongate elements surrounded by an extruded non-circular jacket of polymeric material comprising:- passing the elements in laterally spaced relationship along a passline through a core tube in a cross-head and then through a non-circular die orifice of an extrusion die of the cross-head while extruding a molten polymeric dielectric material around the elements; monitoring a parameter indicative of the angular positions of the elements within the extruded jacket at a position downstream from the die orifice; and upon any monitored value differing from that required for desired angular positions of the elements, controllably rotating the core tube within the cross-head to adjust its angular position and to change the angular position of the elements relative to the die orifice and towards the desired angular positions within the jacket.

One embodiment of the invention will now be described by way of example, with reference to the accompanying drawings, in which:—

Figure 1:
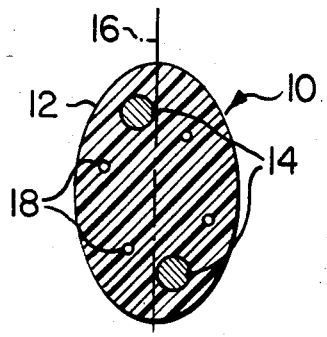
FIG. 1 is a cross-sectional view through a non-circular electrical cable made according to prior art methods and apparatus.

As shown in FIG. 1, an electrical cable in the form of a drop wire 10 has a jacket 12 of elliptical or oval cross-section and the jacket surrounds two laterally spaced-apart conductor wires 14. Because of problems in obtaining symmetry of the conductor wires within a jacket of this shape, it is found that the conductor wires 14 are displaced angularly from desired positions in which they should lie symmetrically upon a major axis 16 of the construction. As shown by FIG. 1, the two conductor wires are displaced in an anti-clockwise direction slightly from the axis 16 so that they lie closer to a part of the surface of the cable jacket on the side of the axis to which they have been displaced than on the other side. In addition to this any reinforcing elements within the cable, such as fiberglass strands 18 are also unsymmetrically positioned as can be seen from FIG. 1.

Figure 2:
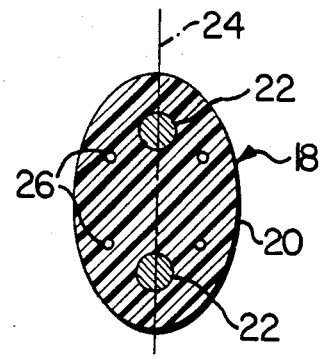
FIG. 2 is a view similar to FIG. 1 through an electrical cable made with apparatus according to the embodiment of the invention.

The cable 18 in FIG. 2 which has the same outside shape as that shown in FIG. 1, is of the desired symmetrical arrangement. As can be seen from FIG. 2, a cable jacket 20 has embedded therein two conductor wires 22 each of which lies symmetrically upon the major axis 24 of the cable. In addition to this, any reinforcing elements such as fiberglass strands 26 extending along the cable are also symmetrically located within the jacket.

The cable shown in FIG. 2 is manufactured according to the embodiment of the present invention now to be described.

In the embodiment, an apparatus for making the drop wire of FIG. 2 comprises a cross-head 28 which is secured to the outlet end of an extruder (not shown). The cross-head comprises a housing 30 which holds a die holder 32 within which is located a die 34. The die has a die orifice 36 which is of elliptical or oval shape complementary to that of the finished drop wire shown in FIG. 2. Upstream from the die orifice is disposed a core tube 38. The core tube has a downstream end 40 which is tapered and extends slightly into the die 34. Between the die and the downstream end 40 of the core tube is provided a flow passage 42 for molten polymeric material 44 which flows through the passages from the extruder. The core tube has two side-by-side guide passages (not shown) for guiding the two conductors 22 through the core tube and directing them through the die orifice in desired positions to enable them to be coated with the jacket material during the extrusion process. Guide passages (not shown) are also provided for the strands 26. The core tube is rotatably mounted within the cross-head and for this purpose it has a cylindrical section 46 upstream from its downstream end 40 and the cylindrical section 46 is rotatably held within a passage 48 of the die holder. To retain the core tube in position, it is provided with a cylindrical shoulder 50, upstream from its cylindrical portion 46, and the shoulder 50 is held against a radial face of the die holder by a retaining nut 52 which is screw threadedly received within the housing 30. Thus the core tube may be rotated within the cross-head so as to angularly adjust the positions of the guide passages for the conductor wires relative to the die orifice.

Figure 3:
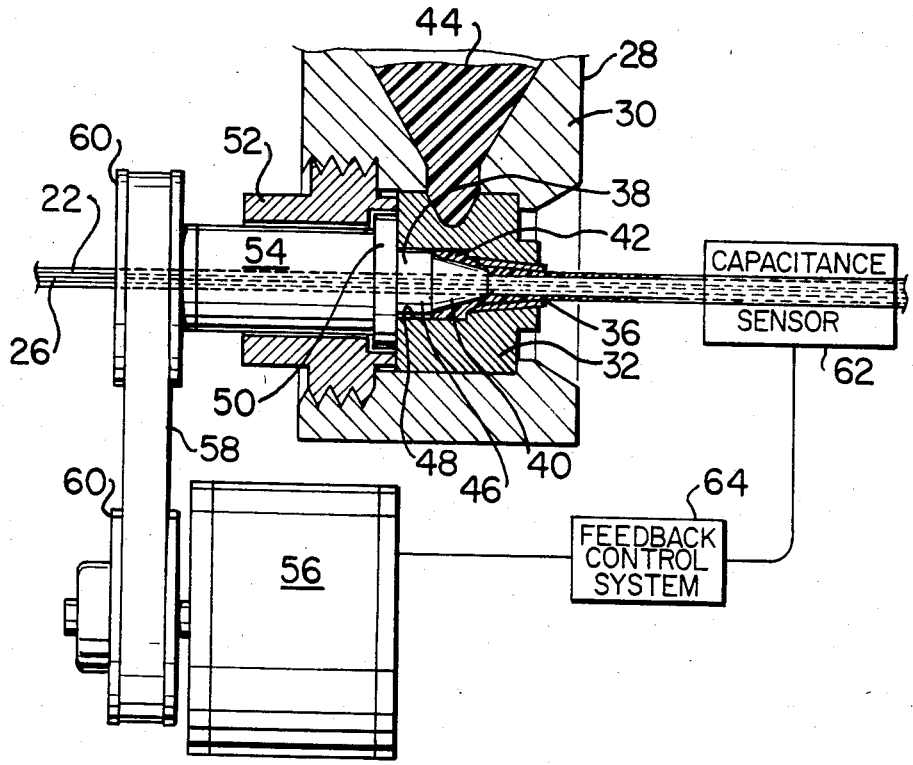
FIG. 3 is a diagrammatic side elevational view, partly in cross-section, of apparatus according to the embodiment.

Means are provided for adjusting the rotational position of the core tube within the cross-head. As can be seen from FIG. 3, the core tube is provided with a cylindrical extension 54 which projects upstream from the shoulder 50. The means for adjusting the rotational position of the core tube comprises a driving means comprising a stepper motor 56 which is drivably connected to the extension 54 of the core tube by an endless drive member or pulley belt 58 extending between two pulley wheels 60 of the adjusting means, one pulley wheel connected to the stepper motor and the other to the extension 54.

The apparatus also includes a monitoring means positioned downstream from the cross-head for monitoring a parameter indicative of the angular position of the laterally spaced elements within the extruded jacket and an analyzing and control means for operating the stepper motor to control the position of the core tube.

The monitoring means comprises a capacitance sensor 62 which is disposed downstream from the die orifice and surrounds the feedpath for the cable. The analyzing and control means comprises a microprocessor 64 which is connected to the capacitance sensor 62 to receive signals from it. These signals are indicative of the capacitance measurements of the cable as the cable moves through the capacitance sensor during movement along the passline. The microprocessor is in turn connected to the stepper motor to control its operation dependent upon an analysis of the signals received from the capacitance sensor.

In use of the apparatus, the two conductor wires 22 and the strands 26 are fed through the guide passages of the core tube and out through the die orifice as the polymeric material is extruded to form the jacket. As will be realized, it is desirable for the conductor wires to be placed symmetrically upon the major axis 24, as shown in FIG. 2, to obtain the required electrical characteristics. As the cable passes through the capacitance sensor 62, the sensor monitors the capacitance of the cable and sends signals indicative of this capacitance to the microprocessor 64. In the microprocessor these signals are analyzed, and if they differ from datum signals indicative of the desired capacitance of the finished cable, then this shows that the conductor wires are not symmetrically disposed within the cable jacket. If there is a difference in signals, then the microprocessor sends a control signal to the stepper motor 56 so as to rotate the core tube an appropriate amount in the required direction. This serves to change the angular position of the guide passages of the core tube relative to the axis of the die orifice and hence changes the angular position of the conductor wires within the jacket to bring the wires towards and into their symmetrical positions upon the major axis. A corresponding rotation of the strands 26 also takes place. Thus any deviation of the conductor wires from their desired paths is quickly and effectively corrected so that the method controls the making of the product to produce the finished symmetrical cable of FIG. 2 with its desired electrical characteristics.

What is claimed is:

1. Apparatus for making an elongate member of indefinite length having at least two laterally spaced elongate elements surrounded by an extruded non-circular jacket of polymeric material comprising an extruder cross-head having an extrusion die defining a die orifice of non-circular cross-section, a core tube within the cross-head and upstream from the die orifice, the core tube defining at least two side-by-side and laterally spaced guide passages for directing the laterally spaced elements through the die orifice as they move along a passline through the cross-head, the core tube mounted within the cross-head to allow for a degree of rotational movement of the core tube for adjusting the angular positions of the elements relative to the die orifice.

2. Apparatus according to claim 1 including a driving means connected to the core tube to adjust its rotational position within the cross-head.

3. Apparatus according to claim 2 wherein the driving means comprises a stepper motor with an endless drive member drivably connecting the motor with the core tube.

4. Apparatus according to claim 2 including a monitoring means positioned downstream from the cross-head for monitoring a parameter indicative of the angular position of the laterally spaced elongate elements within the extruded jacket, and analyzing and control means to analyze monitored values received from the monitoring means and operable, upon an analyzation of a monitored value differing from that required for a desired angular position of the elements within the jacket, to actuate the driving means and rotate the core tube in the appropriate direction to move the elements relative to the die orifice and towards their desired angular positions within the jacket.

5. Apparatus according to claim 4 for making an elongate member in which the two laterally spaced elongate elements comprise electrically conductive wires and the jacket is a dielectric material, wherein the monitoring means comprises a capacitance monitor for producing monitored signals indicative of the capacitance of the elongate member and the analyzing and control means is operable to analyze the signals and to actuate the driving means upon any monitored signal differing from that required for a desired capacitance of the elongate member.

6. A method for producing an elongate member of indefinite length having at least two laterally spaced elongate elements surrounded by an extruded non-circular jacket of polymeric material comprising:

passing the elements in laterally spaced relationship along a passline through a core tube in a cross-head and then through a non-circular die orifice of an extrusion die of the cross-head while extruding a molten polymeric dielectric material around the elements;

monitoring a parameter indicative of the angular positions of the elements within the extruded jacket at a position downstream from the die orifice; and upon any monitored value differing from that required for desired angular positions of the elements, controllably rotating the core tube within the cross-head to adjust its angular position and to change the angular positions of the elements relative to the die orifice and towards the desired angular positions within the jacket.

7. A method according to claim 6 wherein the elongate member comprises at least two elongate elements in the form of electrically conductive wires and the jacket is a dielectric material, the method comprising monitoring the capacitance of the elongate member and controllably rotating the core tube upon any monitored capacitance value differing from that desired for the elongate member.

* * * * *